US008000740B1

(12) United States Patent
Bledsoe et al.

(10) Patent No.: US 8,000,740 B1
(45) Date of Patent: *Aug. 16, 2011

(54) IMAGE TRANSLATION DEVICE FOR A MOBILE DEVICE

(75) Inventors: James D. Bledsoe, Corvallis, OR (US); Asher Simmons, Corvallis, OR (US); Patrick A. McKinley, Corvallis, OR (US); Gregory F. Carlson, Corvallis, OR (US); Todd A. McClelland, Corvallis, OR (US); James Mealy, Corvallis, OR (US)

(73) Assignee: Marvell International Ltd., Hamilton (BM)

( * ) Notice: Subject to any disclaimer, the term of this patent is extended or adjusted under 35 U.S.C. 154(b) by 762 days.

This patent is subject to a terminal disclaimer.

(21) Appl. No.: 11/955,240

(22) Filed: Dec. 12, 2007

Related U.S. Application Data

(60) Provisional application No. 60/892,688, filed on Mar. 2, 2007, provisional application No. 60/892,707, filed on Mar. 2, 2007, provisional application No. 60/883,222, filed on Jan. 3, 2007.

(51) Int. Cl.
*H04B 1/38* (2006.01)
*H04M 1/00* (2006.01)

(52) U.S. Cl. .................. 455/556.1; 455/550.1; 455/557; 455/90.1

(58) Field of Classification Search .................. 455/517, 455/550.1, 557, 556.1, 556.2, 558, 90.1, 455/90.3, 552.1; 358/1.18
See application file for complete search history.

(56) References Cited

U.S. PATENT DOCUMENTS

| | | | | |
|---|---|---|---|---|
| 5,578,813 | A | 11/1996 | Allen et al. | |
| 5,927,872 | A | 7/1999 | Yamada | |
| 7,336,388 | B2 * | 2/2008 | Breton | 358/1.18 |
| 2004/0183913 | A1 * | 9/2004 | Russell | 348/207.2 |
| 2008/0144053 | A1 * | 6/2008 | Gudan et al. | 358/1.8 |

OTHER PUBLICATIONS

U.S. Appl. No. 12/188,056, filed Aug. 7, 2008, Mealy et al.
U.S. Appl. No. 11/955,209, filed Dec. 12, 2007, Bledsoe et al.
U.S. Appl. No. 11/955,228, filed Dec. 12, 2007, Bledsoe et al.
U.S. Appl. No. 11/955,258, filed Dec. 12, 2007, Simmons et al.
U.S. Appl. No. 11/959,027, filed Dec. 18, 2007, Simmons et al.
U.S. Appl. No. 11/968,528, filed Jan. 2, 2008, Simmons et al.
U.S. Appl. No. 11/972,462, filed Jan. 2, 2008, Simmons et al.
U.S. Appl. No. 12/013;313; filed Jan. 11, 2008, Bledsoe et al.
U.S. Appl. No. 12/016,833, filed Jan. 18, 2008, Simmons et al.
U.S. Appl. No. 12/037,045, filed Feb. 25, 2008, Bledsoe et al.
U.S. Appl. No. 12/036,996, filed Feb. 25, 2008, Bledsoe et al.
U.S. Appl. No. 12/037,029, filed Feb. 25, 2008, Bledsoe et al.
U.S. Appl. No. 12/038,660, filed Feb. 27, 2008, McKinley et al.
U.S. Appl. No. 12/041,496, filed Mar. 8, 2008, Mealy et al.
U.S. Appl. No. 12/041,515, filed Mar. 3, 2008, Mealy et al.
U.S. Appl. No. 12/041,535, filed Mar. 3, 2008, Mealy et al.
U.S. Appl. No. 12/062,472, filed Mar. 4, 2008, McKinley et al.

* cited by examiner

*Primary Examiner* — John Lee

(57) ABSTRACT

Systems, apparatuses, and methods for an image translation device for use with a mobile device are described herein. The image translation device may include an image capture module to capture surface images of a medium and a positioning module to determine positioning information based at least in part on navigational measurements and the captured surface images. A print module of the image translation device may cause print forming substances to be deposited based at least in part on the positioning information. A mobile device may include one or more features of the image translation device including the image capture module, the positioning module, and the print module. Other embodiments may be described and claimed.

27 Claims, 8 Drawing Sheets

IMAGE TRANSLATION DEVICE FOR A MOBILE DEVICE

CROSS-REFERENCE TO RELATED APPLICATIONS

This present application is a non-provisional application of provisional application 60/883,222, filed on Jan. 3, 2007, provisional application 60/892,688, filed on Mar. 2, 2007, and provisional application 60/892,707, filed on Mar. 2, 2007, and claims priority to said provisional applications. The specifications of said provisional applications are hereby incorporated in their entirety, except for those sections, if any, that are inconsistent with this specification.

TECHNICAL FIELD

Embodiments of the present invention relate to the field of image translation and, in particular, to an image translation device for mobile devices.

BACKGROUND

Mobile telephones have achieved tremendous popularity among consumers. Many, if not most, consumers own at least one mobile telephone, some of those consumers replacing the traditional landline completely therewith. As such, improvements in capability and functionality of these devices have been met with eager approval. For example, these devices commonly include the most advanced display and image processing technologies as well as text messaging and photographing capabilities. Transforming digital images captured by these devices into a hard-copy format, however, generally has not been available to the consumer in a manner that matches the mobility of these devices. Current desktop printing solutions may be impractical or undesirable options for those consumers who want high-quality printing on the fly.

Traditional printing devices rely on a mechanically operated carriage to transport a print head in a linear direction as other mechanics advance a medium in an orthogonal direction. As the print head moves over the medium an image may be laid down. Portable printers have been developed through technologies that reduce the size of the operating mechanics. However, the principles of providing relative movement between the print head and medium remain the same as traditional printing devices. Accordingly, these mechanics limit the reduction of size of the printer as well as the material that may be used as the medium.

Handheld printing devices have been developed that ostensibly allow an operator to manipulate a handheld device over a medium in order to print an image onto the medium. However, these devices are challenged by the unpredictable and nonlinear movement of the device by the operator. The variations of operator movement make it difficult to determine the precise location of the print head. This type of positioning error may have deleterious effects of the quality of the printed image. This is especially the case for relatively large print jobs, as the positioning error may accumulate in a compounded manner over the entire print operation.

SUMMARY

In view of the challenges in the state of the art, at least some embodiments of the present invention are based on the technical problem of providing an image translation device for use with a mobile device that may accurately determine position of the image translation device and/or the mobile device over an entire print operation. More specifically, there is provided, in accordance with various embodiments of the present invention, an image translation apparatus including a communication interface configured to receive image data from a mobile device; one or more optical imaging sensors configured to capture a first plurality of surface images of a first portion of a medium; one or more navigation sensors configured to capture first navigational measurements of the first portion of the medium; a print head configured to selectively deposit a printing substance on the medium; and a control block configured to construct a composite image based at least in part on the first plurality of surface images and to selectively control the print head to deposit the printing substance based at least in part on the first navigational measurements and the image data.

In some embodiments, the control block may include a positioning module configured to control the one or more navigation sensors and to determine the position of the apparatus relative to the first reference point based at least in part on the first navigational measurements.

In some embodiments, the control block may be configured to control the one or more navigation sensors to capture second navigational measurements of a second portion of the medium and to determine a plurality of positions of the apparatus relative to a second reference point based at least in part on the second navigational measurements.

In some embodiments, the control block may be configured to control the one or more optical imaging sensors to selectively capture a second plurality of surface images of the second portion of the medium and to construct the composite image based at least in part on the determined plurality of positions of the apparatus and the second plurality of surface images.

In some embodiments, the control block may be configured to transmit the first plurality of surface images to the mobile device.

In some embodiments, the apparatus may include a print module configured to selectively cause the printing substance to be deposited on the first portion of the medium based at least in part on the image data and the determined position of the apparatus.

In some embodiments, the apparatus may include an image capture module configured to control the one or more optical imaging sensors to capture the first plurality of surface images.

In some embodiments, the apparatus may include an image processing module configured to process the image data in a manner to facilitate deposition of the printing substance.

In some embodiments, the print head may include a plurality of nozzles.

In some embodiments, the communication interface may comprise a wireless communication interface. In various embodiments, the apparatus may be configured to couple to the mobile device.

There is also provided, in accordance with various embodiments of the present invention, a mobile device that may comprise a communication interface configured to receive image data from and provide image data to an image translation apparatus; a positioning module configured to control one or more navigation sensors of the image translation apparatus to capture first navigational measurements of a first portion of a medium and to determine a position of the image translation apparatus relative to a first reference point based at least in part on the first navigational measurements; an image capture module configured to control one or more optical imaging sensors of the image translation apparatus to capture a first plurality of surface images of the first portion of the medium and to construct a composite image based at least in part on the first navigational measurements and the first plurality of surface images; and a print module configured to selectively cause a printing substance to be deposited on the first portion of the medium based at least in part on the first navigational measurements and the image data provided to the image translation apparatus.

In some embodiments, the positioning module may be configured to control the one or more navigation sensors to capture second navigational measurements of a second portion of the medium, and to determine a plurality of positions of the image translation apparatus relative to a second reference point based at least in part on the second navigational measurements.

In some embodiments, the image capture module may be configured to control the one or more optical imaging sensors to capture a second plurality of surface images of the second portion of the medium and to construct the composite image based at least in part on the determined plurality of positions of the image translation apparatus and the second plurality of surface images.

In some embodiments, the image capture module may be configured to transmit the first plurality of surface images to a remote device. In various embodiments, the image capture module may be configured to transmit the first plurality of surface images to the remote device by a selected one of e-mail, fax, and file transfer protocol.

In some embodiments, the mobile device may include an image processing module configured to process the image data in a manner to facilitate deposition of the printing substance.

In some embodiments, the communication interface may comprise a wireless communication interface. In various embodiments, the mobile device may be configured to couple to the image translation device.

A method is also provided in accordance with various embodiments. The method may include receiving image data from a mobile device; controlling one or more navigation sensors to capture first navigational measurements of a first portion of a medium; controlling one or more optical image sensors to capture a first plurality of surface images of the first portion of the medium; constructing a composite image based at least in part on the first navigational measurements and the first plurality of surface images; and selectively controlling the print head to deposit the printing substance based at least in part on the first navigational measurements and the image data.

In some embodiments, the method may include determining a position of an image translation device relative to a first reference point based at least in part on the first navigational measurements.

In some embodiments, the method may include controlling the one or more navigation sensors to capture second navigational measurements of a second portion of the medium; determining a plurality of positions of the image translation device relative to a second reference point based at least in part on the second navigational measurements; controlling the one or more optical image sensors to capture a second plurality of surface images of the second portion of the medium; and wherein constructing the composite image is further based at least in part on the determined plurality of positions and the second plurality of surface images.

In some embodiments, the method may include determining the position of the image translation device based at least further in part on one or more of the first plurality of surface images.

In some embodiments, the method may include processing the received image data in a manner to facilitate said controlling of the print head to deposit the printing substance.

In some embodiments, the method may include selectively transmitting the first plurality of surface images to the mobile telephone.

Other features that are considered as characteristic for embodiments of the present invention are set forth in the appended claims.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

In the following detailed description, reference is made to the accompanying drawings which form a part hereof wherein like numerals designate like parts throughout, and in which are shown, by way of illustration, specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

Reference in the specification to "one embodiment" or "an embodiment" means that a particular feature, structure, or characteristic described in connection with the embodiment is included in at least one embodiment. The appearances of the phrase "in one embodiment" in various places in the specification do not necessarily all refer to the same embodiment, but they may.

The phrase "A and/or B" means (A), (B), or (A and B). The phrase "A, B, and/or C" means (A), (B), (C), (A and B), (A and C), (B and C) or (A, B and C). The phrase "(A) B" means (A B) or (B), that is, A is optional.

Mobile devices as described herein may include various handheld devices and the like. For example, a mobile device may include, but is not limited to, a mobile telephone, a personal digital assistant, or a smartphone. Although embodiments described herein may particularly refer to a mobile telephone, it is contemplated that embodiments of the present disclosure may be equally applicable to other mobile devices.

Figure 1:
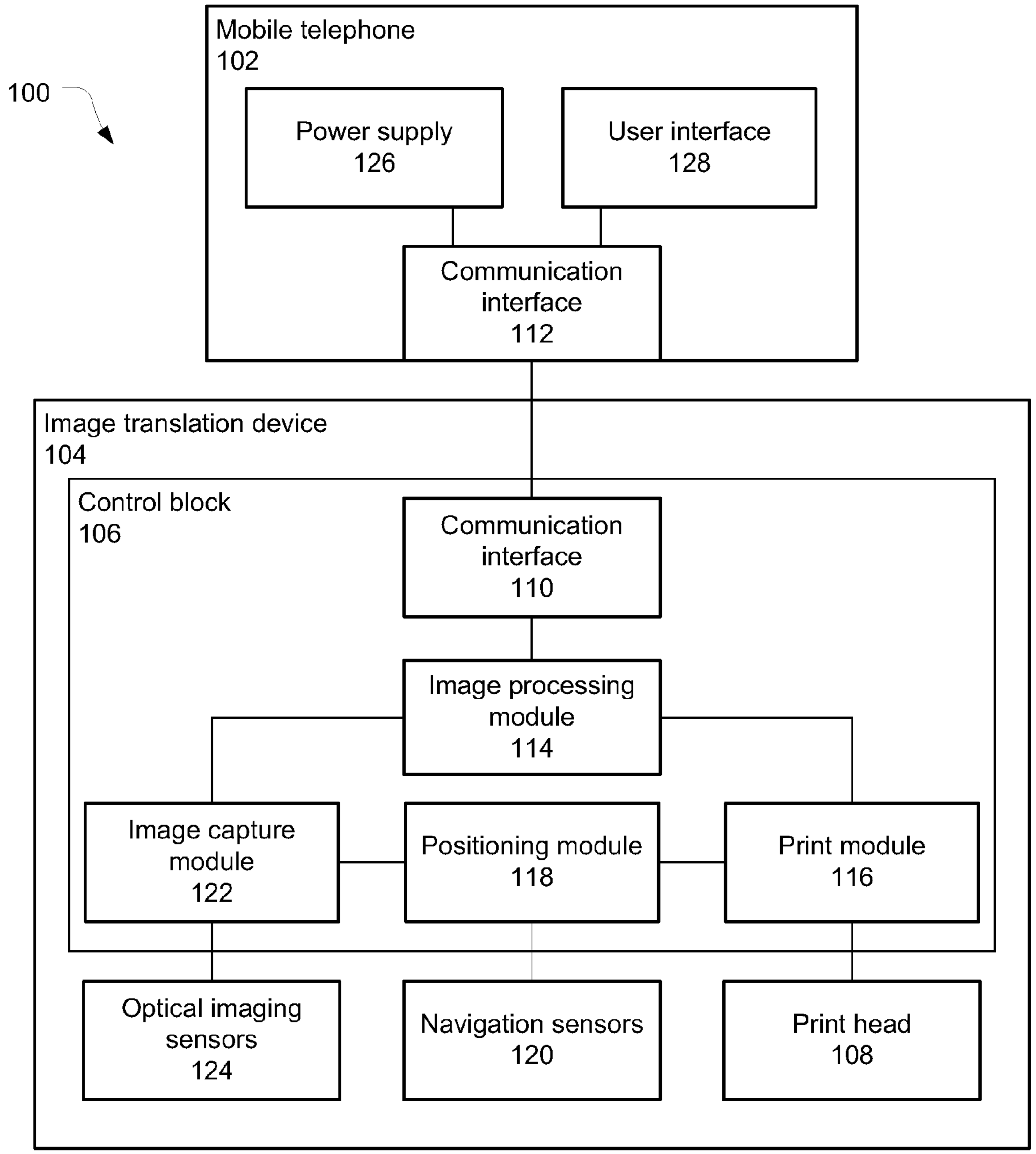
FIG. 1 is a schematic of a system including a mobile telephone and an image translation device in accordance with various embodiments of the present invention.

FIG. 1 is a schematic of a system 100 including a mobile telephone 102 and an image translation device 104, hereinafter image translation device 104, in accordance with various embodiments of the present invention. The image translation device 104 may include a control block 106 with components designed to control one or more navigation sensors 120 in a manner to facilitate precise and accurate positioning of a print head 108 throughout an entire printing operation. This positioning may allow for reliable image production, through printing, and image acquisition, through scanning, in a truly mobile and versatile platform as will be explained herein.

Image translation, as used herein, may refer to a translation of an image that exists in a particular context (e.g., medium) into an image in another context. For example, an image translation operation may be a scan operation. For scanning operations, a target image, e.g., an image that exists on a tangible medium, is scanned by the image translation device 104 and an acquired image that corresponds to the target image is created and stored in memory of the image translation device 104. For another example, an image translation operation may be a print operation. In this situation, an acquired image, e.g., an image as it exists in memory of the image translation device 104, may be printed onto a medium. In various embodiments, image translation may include one or more scan operations and one or more print operations. For example, a target image may be copied by a scan operation and then a print operation.

The control block 106 may include a communication interface 110 configured to communicatively couple the control block 106 to a communication interface 112 of the mobile telephone 102. The mobile telephone 102 may be configured to transmit data related to an image to be printed. Such images may include images either captured by a camera device of the mobile telephone 102 or otherwise transmitted to the mobile telephone 102. Similarly, images may include an image of a text or an e-mail message, a document, or other images.

The communication interface 110 may include a wireless transceiver to allow the communicative coupling with the mobile telephone 102 to take place over a wireless link. The image data may be wirelessly transmitted over the link through the modulation of electromagnetic waves with frequencies in the radio, infrared or microwave spectrums.

A wireless link may contribute to the mobility and versatility of the image translation device 104. However, some embodiments may additionally/alternatively include a wired link communicatively coupling the mobile telephone 102 to the communication interface 110.

In some embodiments, the communication interface 110 may communicate with the mobile telephone 102 through one or more wired and/or wireless networks including, but not limited to, personal area networks, local area networks, wide area networks, metropolitan area networks, etc. The data transmission may be done in a manner compatible with any of a number of standards and/or specifications including, but not limited to, 802.11, 802.16, Bluetooth, Global System for Mobile Communications (GSM), code-division multiple access (CDMA), Ethernet, etc.

The communication interface 110 may transmit the image data to an on-board image processing module 114. As illustrated, the image processing module 114 is located on the image translation device 104. In other embodiments, however, the image processing module 114, at least in part, may be located on the mobile telephone 102 and such a configuration may minimize the overall size and/or expense of the image translation device 104.

The image processing module 114 may process the image data in a manner to facilitate an upcoming printing process. Image processing techniques may include dithering, decompression, half-toning, color plane separation, and/or image storage. In various embodiments some or all of these image processing operations may be performed by the mobile telephone 102 or another device. The processed image may then be transmitted to a print module 116 where it may be saved to memory in anticipation of a print operation.

The print module 116 may also receive positioning information, indicative of a position of the print head 108 relative to a reference point, from a positioning module 118. The positioning module 118 may be communicatively coupled to one or more navigation sensors 120. The navigation sensors 120 may include a light source, e.g., LED, a laser, etc., and an optoelectronic sensor designed to take a series of pictures of a medium adjacent to the image translation device 104 as the image translation device 104 is moved over the medium. The positioning module 118 may process the pictures provided by the navigation sensors 120 to detect structural variations of the medium. The movement of the structural variations in successive pictures may indicate motion of the image translation device 104 relative to the medium. Tracking this relative movement may facilitate determination of the precise positioning of the navigation sensors 120. The navigation sensors 120 may be maintained in a structurally rigid relationship with the print head 108, thereby allowing for the calculation of the precise location of the print head 108.

The medium, as used in embodiments herein, may be any type of medium on which a printing substance, e.g., ink, powder, etc., may be deposited. It is not limited to printed paper or other thin, flexible print media commonly associated with traditional printing devices.

The navigation sensors 120 may have operating characteristics sufficient to track movement of the image translation device 104 with the desired degree of precision. In an exemplary embodiment, the navigation sensors 120 may process approximately 2000 frames per second, with each frame including a rectangular array of 18×18 pixels. Each pixel may detect a six-bit grayscale value, e.g., capable of sensing 64 different levels of gray.

Once the print module 116 receives the positioning information it may coordinate the location of the print head 108 to a portion of the processed image with a corresponding location. The print module 116 may then control the print head 108 in a manner to deposit a printing substance on the medium to represent the corresponding portion of the processed image.

The print head 108 may be an inkjet print head having a plurality of nozzles designed to emit liquid ink droplets. The ink, which may be contained in reservoirs/cartridges, may be black and/or any of a number of various colors. A common, full-color inkjet print head may have nozzles for cyan, magenta, yellow, and black ink. Other embodiments may utilize other printing techniques, e.g., toner-based printers such as laser or light-emitting diode (LED) printers, solid ink printers, dye-sublimation printers, inkless printers, etc.

The control block 106 may also include an image capture module 122. The image capture module 122 may be communicatively coupled to one or more optical imaging sensors 124. The optical imaging sensors 124 may include a number of individual sensor elements. The optical imaging sensors

124 may be designed to capture a plurality of surface images of the medium, which may be individually referred to as component surface images. The image capture module 122 may generate a composite image by stitching together the component surface images. The image capture module 122 may receive positioning information from the positioning module 118 to facilitate the arrangement of the component surface images into the composite image.

In an embodiment in which the image translation device 104 is capable of scanning full color images, the optical imaging sensors 124 may have the sensors elements designed to scan different colors.

A composite image acquired by the image translation device 104 may be subsequently transmitted to the mobile telephone 102 and/or one or more of the other devices by, e.g., e-mail, fax, file transfer protocols, etc. The composite image may be additionally/alternatively stored locally by the image translation device 104 for subsequent review, transmittal, printing, etc.

The image capture module 122 may be configured to calibrate the positioning module 118. In various embodiments, the component surface images (whether individually, some group, or collectively as the composite image) may be compared to the processed print image rendered by the image processing module 114 to correct for accumulated positioning errors and/or to reorient the positioning module 118 in the event the positioning module 118 loses track of its reference point. This may occur, for example, if the image translation device 104 is removed from the medium during a print operation.

The image translation device 104 may include its own dedicated power supply (not illustrated) and/or may receive power from a power supply 126 of the mobile telephone 102. The power supply of the image translation device 104 and/or the power supply 126 of the mobile telephone 102 may be a mobile power supply, e.g., a battery, a rechargeable battery, a solar power source, etc. In other embodiments, the power supply of the image translation device 104 and/or the power supply 126 of the mobile telephone 102 may additionally/alternatively regulate power provided by another component (e.g., another device, a power cord coupled to an alternating current (AC) outlet, etc.).

The mobile telephone 102 may include a user interface 128, as is generally present on known mobile telephones. The user interface 128 may include keys or similar features for inputting numbers and/or letters, adjusting volume and screen brightness, etc. Advantageously, the user interface 128 may also be configured to control one or more aspects of a printing and/or scanning operation by the image translation device 104. For example, the user interface 128 may allow a user to select an image, the data for which is to be used for the printing operation, and to send the image data to the image processing module 114. The user interface 128 may be used to start and/or stop the printing and/or scanning operation, repeat the printing and/or scanning operation, adjust the printing and/or scanning operation, etc. In other embodiments, however, the image translation device 104 may include its own dedicated user interface (not illustrated).

Figure 2:
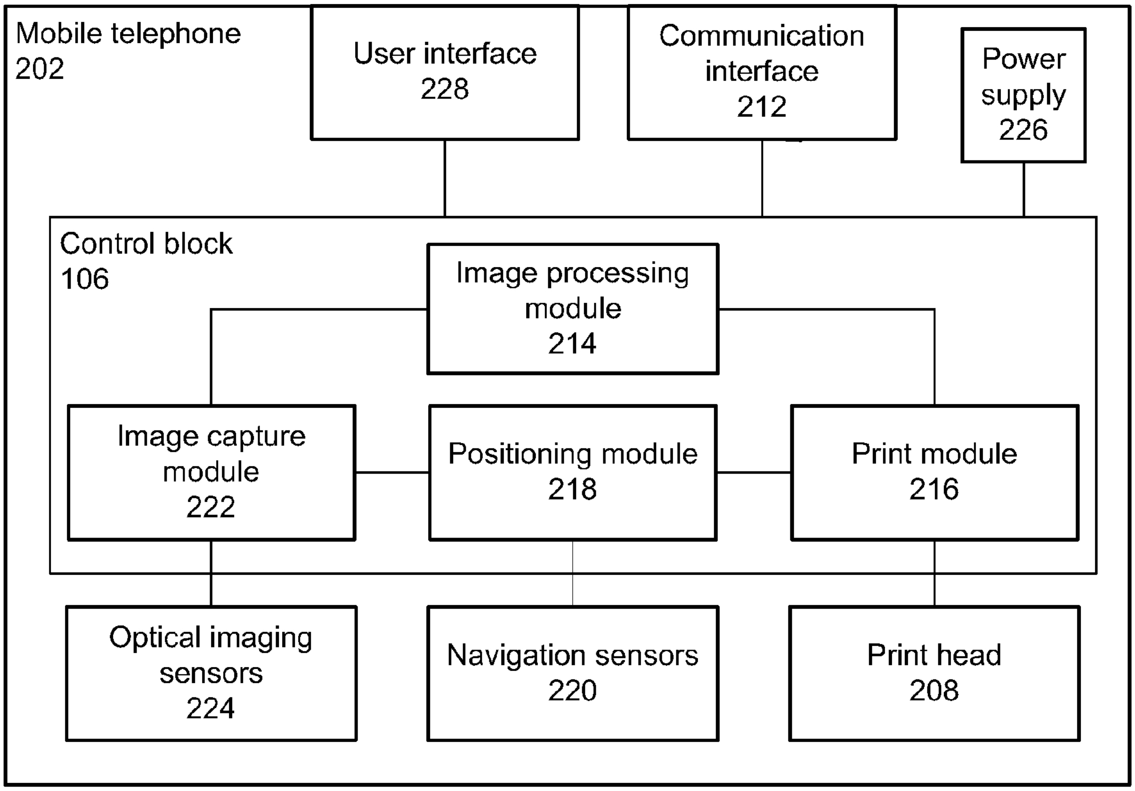
FIG. 2 is a schematic of another system including a mobile telephone and an image translation device in accordance with various embodiments of the present invention.

The mobile telephone 102 and the image translation device 104 may be physically coupled, at least temporarily. In these embodiments, the housings of the mobile telephone 102 and the image translation device 104 may be configured to interlock or snap together such that a user may attach the image translation device 104 to the mobile telephone 102 when a printing operation is desired yet decouple them when not needed. For example, the communication interface 112 of the image translation device 104 may comprise a port to receive the mobile telephone 102. In other embodiments, however, the image translation device 104 and the mobile telephone 102 may be fully integrated. As illustrated in FIG. 2, for example, a mobile telephone 202 may include a user interface 228, a communication interface 212, a control block 206, a power supply 226, one or more print heads 208, optical imaging sensors 224, and one or more navigation sensors 220. The control block 206 may include an image processing module 214, an image capture module 222, a positioning module 218, and a print module 216.

Figure 3:
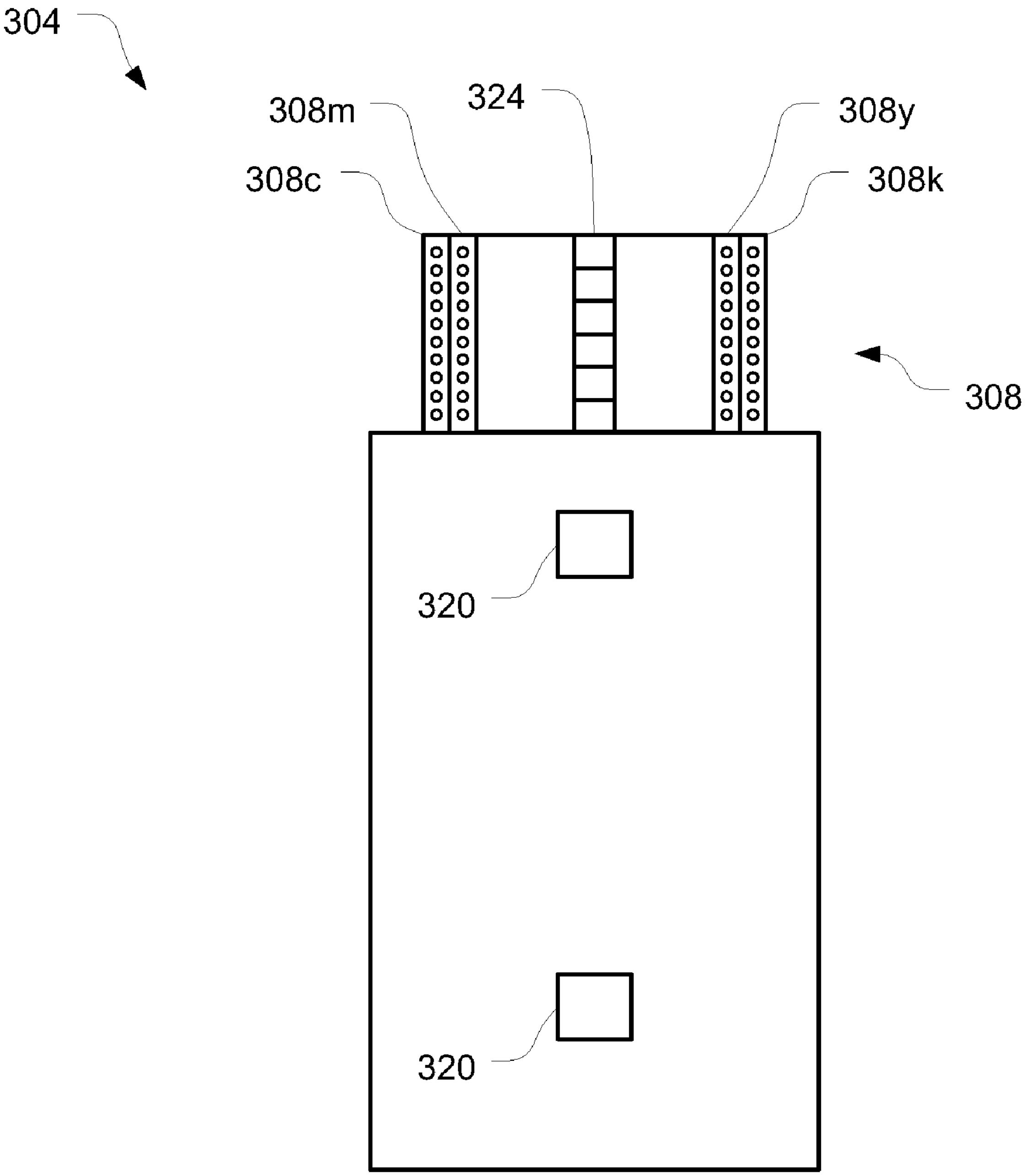
FIG. 3 is a bottom plan view of an image translation device in accordance with various embodiments of the present invention.

FIG. 3 is a bottom plan view of an image translation device 304 in accordance with various embodiments of the present invention. The image translation device 304, which may be substantially interchangeable with the image translation device 104, may have a pair of navigation sensors 320 and a print head 308.

The pair of navigation sensors 320 may be used by a positioning module to determine positioning information related to the optical imaging sensors 324 and/or the print head 308. As stated above, the proximal relationship of the optical imaging sensors 324 and/or print head 308 to the navigation sensors 320 may be fixed to facilitate the positioning of the optical imaging sensors 324 and/or print head 308 through information obtained by the navigation sensors 320.

The print head 308 may be an inkjet print head having a number of nozzle rows for different colored inks. In particular, and as shown in FIG. 3, the print head 308 may have a nozzle row 308*c* for cyan-colored ink, a nozzle row 308*m* for magenta-colored ink, a nozzle row 308*y* for yellow-colored ink, and nozzle row 308*k* for black-colored ink. The nozzle rows of the print head 308 may be arranged around the optical imaging sensors 324. This may allow for the optical imaging sensors 324 to capture information about the ink deposited on the medium, which represents the processed image in various formative stages, for the predominant side-to-side motion of the image translation device 104.

In various embodiments the placement of the nozzles of the print head 308 and the sensor elements of the optical imaging sensors 324 may be further configured to account for the unpredictable nature of movement of the image translation device 104. For example, while the nozzles and sensor elements are arranged in linear arrays in the image translation device 104 other embodiments may arrange the nozzles and/or sensor elements in other patterns. In some embodiments the nozzles may be arranged completely around the sensor elements so that whichever way the image translation device 104 is moved the optical imaging sensors 324 will capture component images reflecting deposited ink. In some embodiments, the nozzles may be arranged in rings around the sensor elements (e.g., concentric circles, nested rectangular patterns, etc.).

While the nozzle rows 308*c*, 308*m*, 308*y*, and 308*k* shown in FIG. 3 are arranged in rows according to their color, other embodiments may intermix the different colored nozzles in a manner that may increase the chances that an adequate amount of appropriate colored ink is deposited on the medium through the natural course of movement of the image translation device 304 over the medium.

In the embodiment depicted by FIG. 3, the linear dimension of the optical imaging sensors 324 may be similar to the linear dimension of the nozzle rows of the print head 308. The linear dimensions may refer to the dimensions along the major axis of the particular component, e.g., the vertical axis of the optical imaging sensors 324 as shown in FIG. 3. Having similar linear dimensions may provide that roughly the same amount of passes over a medium are required for a complete scan and print operation. Furthermore, having similar dimensions may also facilitate the positioning calibration as a component surface image captured by the optical imaging sensors 324 may correspond to deposits from an entire nozzle row of the print head 308.

Figure 4:
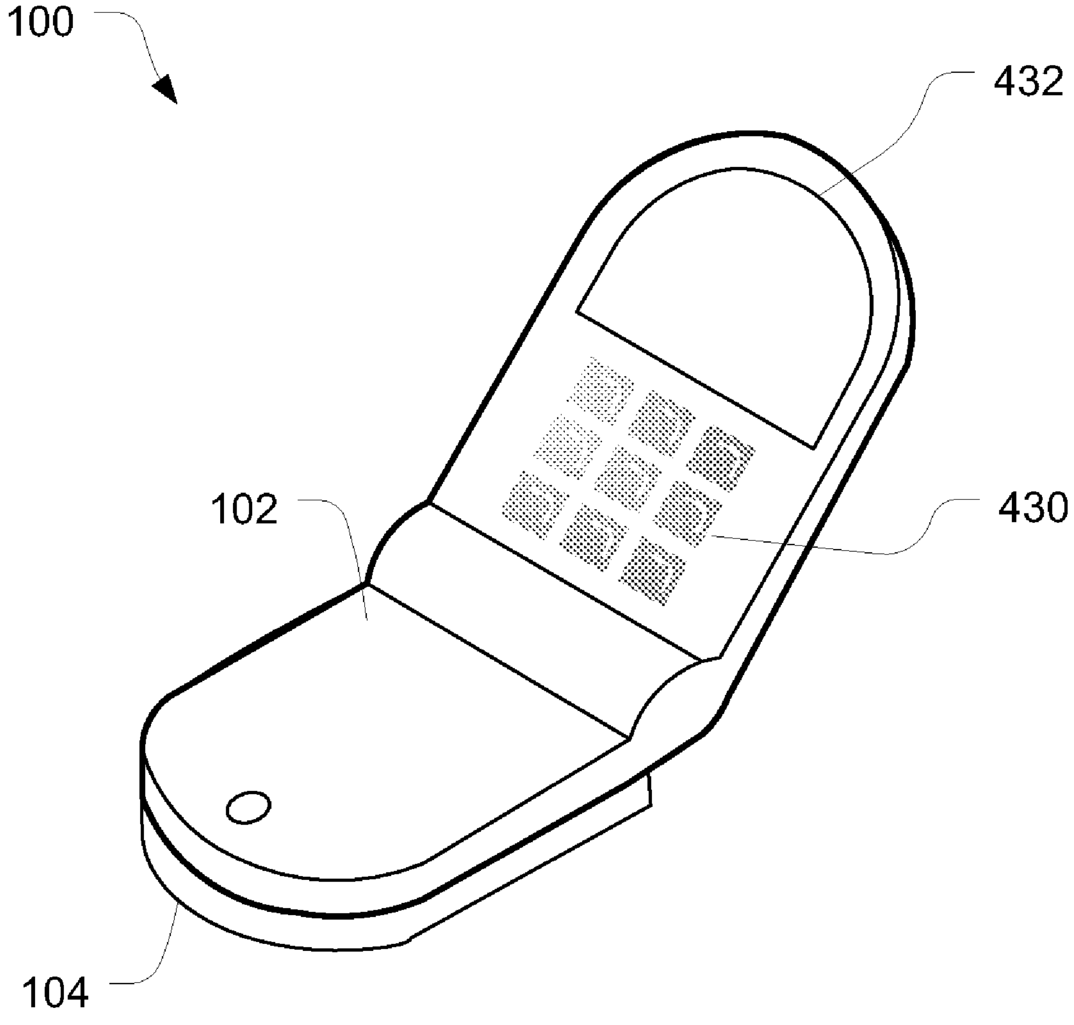
FIG. 4 illustrates a mobile telephone including an image translation device in accordance with various embodiments of the present invention.

FIG. 4 illustrates another view of the printing system 100 in accordance with various embodiments of the present invention. As illustrated, the image translation device 104 couples to the mobile telephone 102 such that a user may manipulate the image translation device 104 by moving the system 100 across a medium. The mobile telephone 102 may include a user interface to allow for inputs/outputs to provide the functionality enabled through use of the image translation device 104. Some examples of inputs/outputs that may be used to provide some of the basic functions of the image translation device 104 include, but are not limited to, one or more keys 430 or similar features for controlling initiate/resume of a print operation and a display 432.

The display 432, which may be a passive display, an interactive display, etc., may provide the user with a variety of information. The information may relate to the current operating status of the image translation device 104 (e.g., printing, ready to print, receiving print image, transmitting print image, etc.), power of the battery, errors (e.g., scanning/positioning/printing error, etc.), instructions (e.g., "position device over a printed portion of the image for reorientation," etc.). If the display 432 is an interactive display it may provide a control interface in addition to, or as an alternative from, the keys 430.

Figure 5:
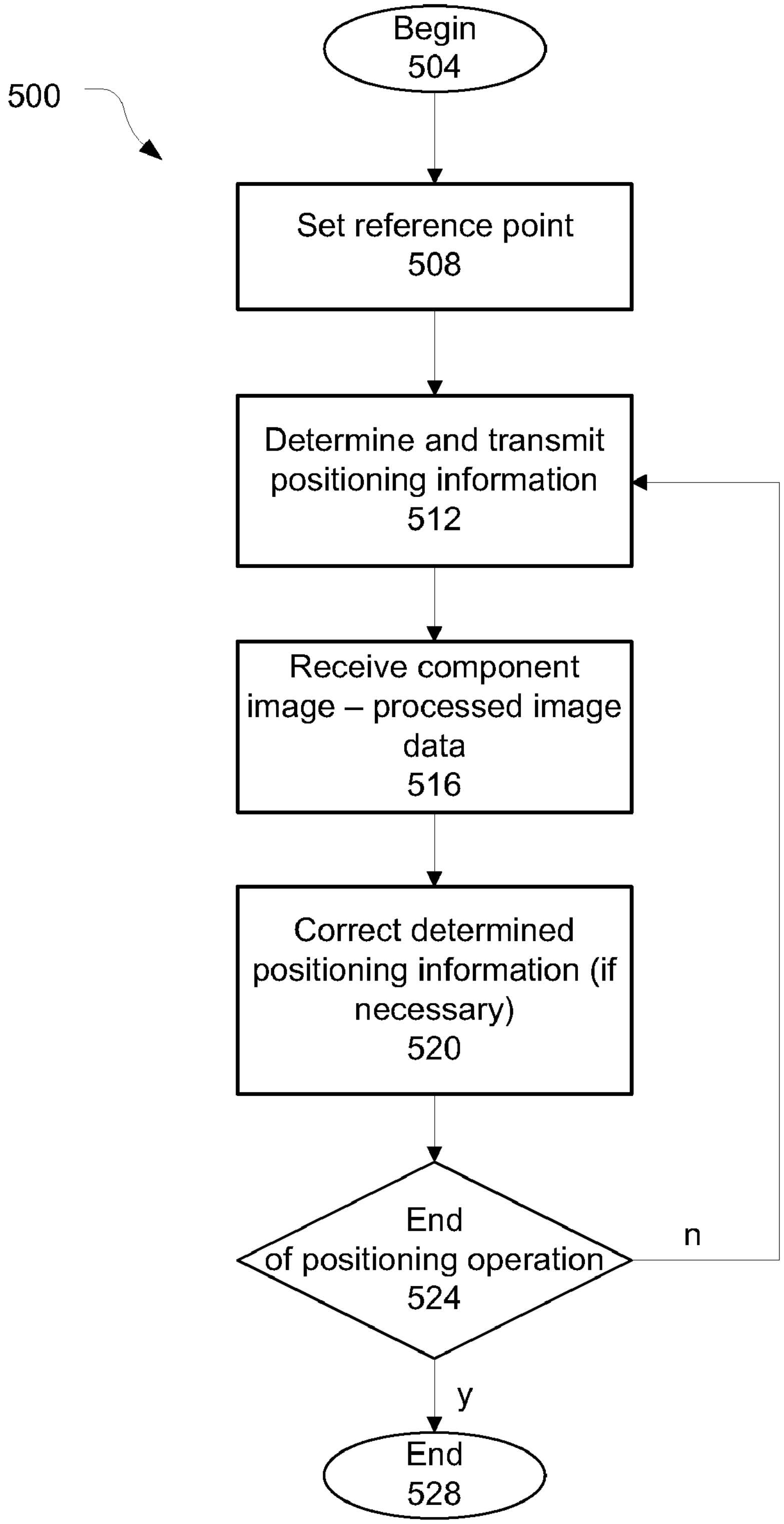
FIG. 5 is a flow diagram depicting a positioning operation of an image translation device in accordance with various embodiments of the present invention.

FIG. 5 is a flow diagram 500 depicting a positioning operation of an image translation device (such as 104 or 304, for example) or of a mobile telephone (such as 202, for example) in accordance with various embodiments of the present invention. A positioning operation may begin in block 504 with an initiation of a scanning or a printing operation. A positioning module within the image translation device may set a reference point in block 508. The reference point may be set when the image translation device is placed onto a medium at the beginning of a print or scan job. This may be ensured by the user entering some input (by way of a user interface 128 or 228, for example) once the image translation device is in place and/or by the proper placement of the image translation device being treated as a condition precedent to instituting the positioning operation. In some embodiments, the proper placement of the image translation device may be automatically determined through the navigation sensors (120, 220, or 320, for example), the optical imaging sensors (124, 224, or 324, for example), and/or some other sensors (e.g., a proximity sensor).

Once the reference point is set in block 508, the positioning module may determine positioning information, e.g., translational and/or rotational changes from the reference point, using the navigation sensors in block 512. Positioning information may be transmitted (to a positioning module, for example). The translational changes may be determined by tracking incremental changes of the positions of the navigation sensors along a two-dimensional coordinate system, e.g., $\Delta x$ and $\Delta y$. Rotational changes may be determined by tracking incremental changes in the angle of the image translation device, e.g., $\Delta\Theta$, with respect to, e.g., the y-axis of the media. These transitional and/or rotational changes may be determined by the positioning module comparing consecutive navigational measurements taken by the navigation sensors to detect these movements.

The positioning module may also receive component surface images from the optical imaging sensors and processed image data from the image processing module in block 516. If the positioning information is accurate, a particular component surface image from a given location should match a corresponding portion of the processed image. If the given location is one in which the print head (108, 208, or 308, for example) has deposited something less than the target print volume for the location, the corresponding portion of the processed image may be adjusted to account for the actual deposited volume for comparison to the component surface image. In the event that the print head has yet to deposit any material in the given location, the positioning information may not be verified through this method. However, the verification of the positioning information may be done frequently enough given the constant movement of the image translation device and the physical arrangement of the nozzle rows of the print head in relation to the optical imaging sensors.

If the particular component surface image from the given location does not match the corresponding portion of the processed image the positioning module may correct the determined positioning information in block 520. Given adequate information, e.g., sufficient material deposited in the location captured by the component surface image, the positioning module may set the positioning information to the offset of the portion of the processed image that matches the component surface image. In most cases this may be an identified pattern in close proximity to the location identified by the incorrect positioning information. In the event that the pattern captured by the component surface image does not identify a pattern unique to the region surrounding the incorrect positioning information, multiple component surface images may be combined in an attempt to identify a unique pattern. Alternatively, correction may be postponed until a component surface image is captured that does identify a pattern unique to the surrounding region.

In some embodiments, the correction of the determined positioning information in block 520 may be done periodically in order to avoid overburdening the computational resources of the positioning module.

Following correction in block 520, the positioning module may determine whether the positioning operation is complete in block 524. If it is determined that the positioning operation is not yet complete, the operation may loop back to block 512. If it is determined that it is the end of the positioning operation, the operation may end in block 528. The end of the positioning operation may be tied to the end of the printing/scanning operation.

Figure 6:
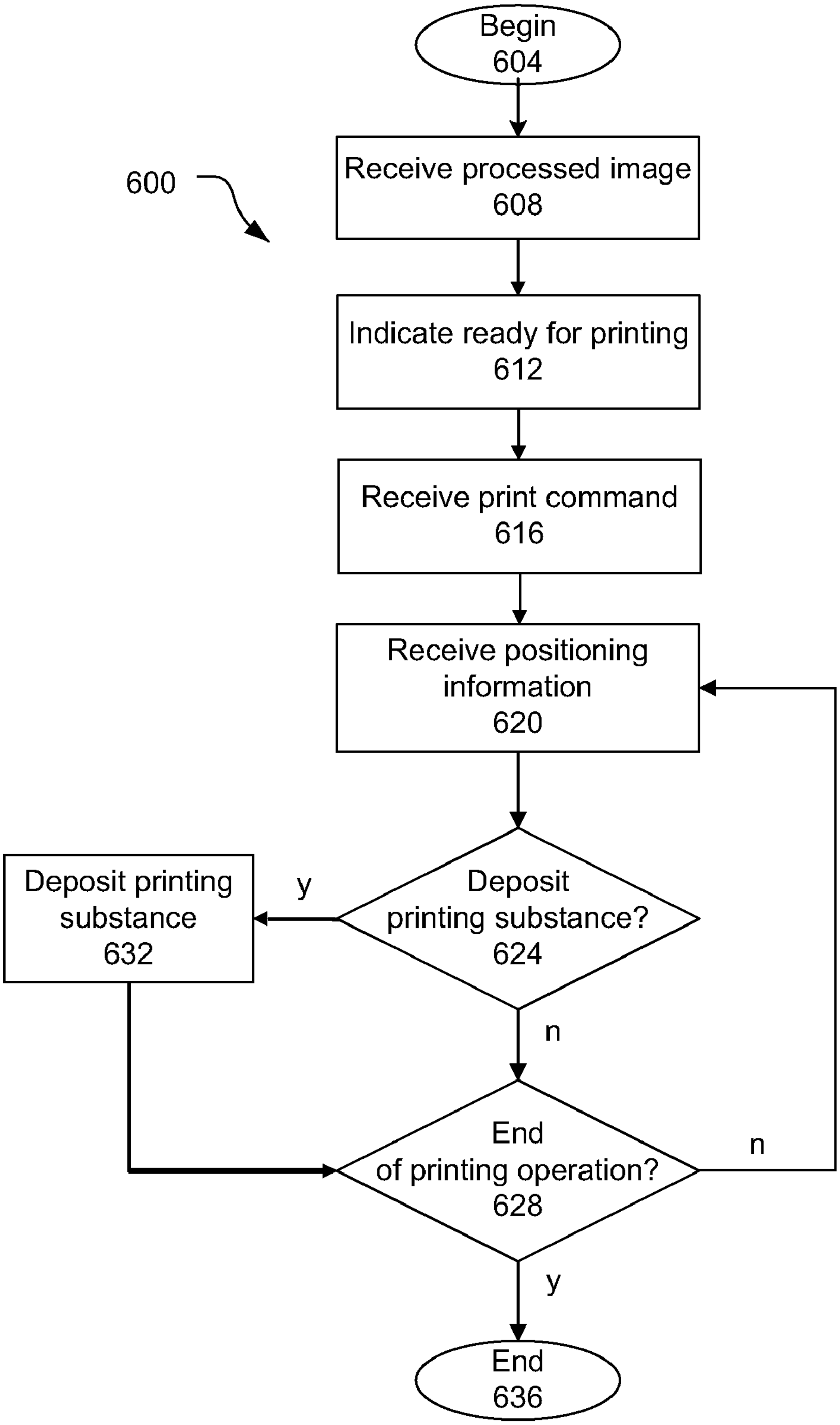
FIG. 6 is a flow diagram depicting a printing operation of an image translation device in accordance with various embodiments of the present invention.

FIG. 6 is a flow diagram 600 depicting a printing operation of an image translation device (such as 104 or 304, for example) or of a mobile telephone (such as 202, for example) in accordance with various embodiments of the present invention. The printing operation may begin in block 604. The print module may receive a Processed image from the image processing module in block 608. Upon receipt of the processed image, the display may indicate that the image translation device is ready for printing in block 612.

The print module may receive a print command generated from a user entering some input (by way of a user interface 128 or 228, for example) in block 616. The print module may then receive positioning information from the positioning module in block 620. The print module may then determine whether to deposit printing substance at the given position in block 624. The determination as to whether to deposit printing substance may be a function of the total drop volume for a given location and the amount of volume that has been previously deposited.

If it is determined that no additional printing substance is to be deposited in block 624, the operation may advance to block 628 to determine whether the end of the print operation has been reached. If it is determined that additional printing substance is to be deposited in block 624, the print module may cause an appropriate amount of printing substance to be deposited in block 632 by generating and transmitting control signals to the print head that cause the nozzles to drop the printing substance.

The determination of whether the end of the printing operation has been reached in block 628 may be a function of the printed volume versus the total print volume. In some embodiments the end of the printing operation may be reached even if the printed volume is less than the total print volume. For example, an embodiment may consider the end of the printing operation to occur when the printed volume is ninety-five percent of the total print volume. However, it may be that the distribution of the remaining volume is also considered in the end of print analysis. For example, if the five percent remaining volume is distributed over a relatively small area, the printing operation may not be considered to be completed.

In some embodiments, an end of print job may be established by a user manually cancelling the operation.

If, in block 628, it is determined that the printing operation has been completed, the printing operation may conclude in block 636.

If, in block 628, it is determined that the printing operation has not been completed, the printing operation may loop back to block 620.

Figure 7:
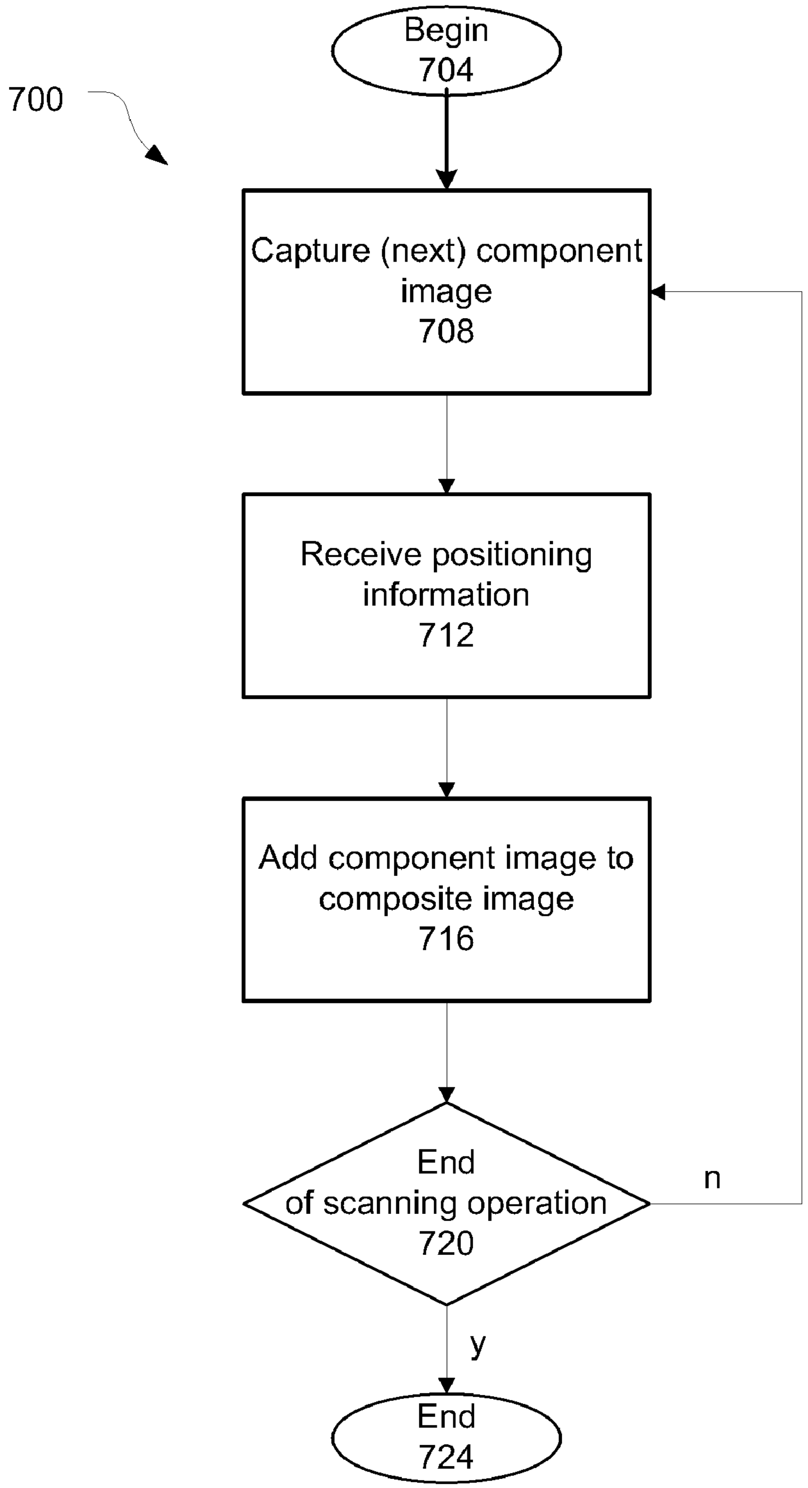
FIG. 7 is a flow diagram depicting a scanning operation of an image translation device in accordance with various embodiments of the present invention.

FIG. 7 is a flow diagram 700 depicting a scanning operation of an image translation device (such as 104 or 304, for example) or of a mobile telephone (such as 202, for example) in accordance with various embodiments of the present invention. The scanning operation may begin in block 704 with the receipt of a scan command generated from a user generated from a user entering some input (by way of a user interface 124, for example).

The image capture module may control the optical imaging sensors to capture one or more component images in block 708. In some embodiments, the scan operation will only commence when the image translation device is placed on a medium. This may be ensured by manners similar to those discussed above with respect to the printing operation, e.g., by instructing the user to initiate scanning operation only when the image translation device is in place and/or automatically determining that the image translation device is in place.

The image capture module may receive positioning information from the positioning module in block 712 and add the component images to the composite image in block 716. The image capture module may then determine if the scanning operation is complete in block 720.

The end of the scanning operation may be determined through a user manually cancelling the operation and/or through an automatic determination. In some embodiments, an automatic determination of the end of scan job may occur when all interior locations of a predefined image border have been scanned. The predefined image border may be determined by a user providing the dimensions of the image to be scanned or by tracing the border with the image translation device early in the scanning sequence.

If, in block 720, it is determined that the scanning operation has been completed, the scanning operation may conclude in block 724.

If, in block 720, it is determined that the scanning operation has not been completed, the scanning operation may loop back to block 708.

Figure 8:
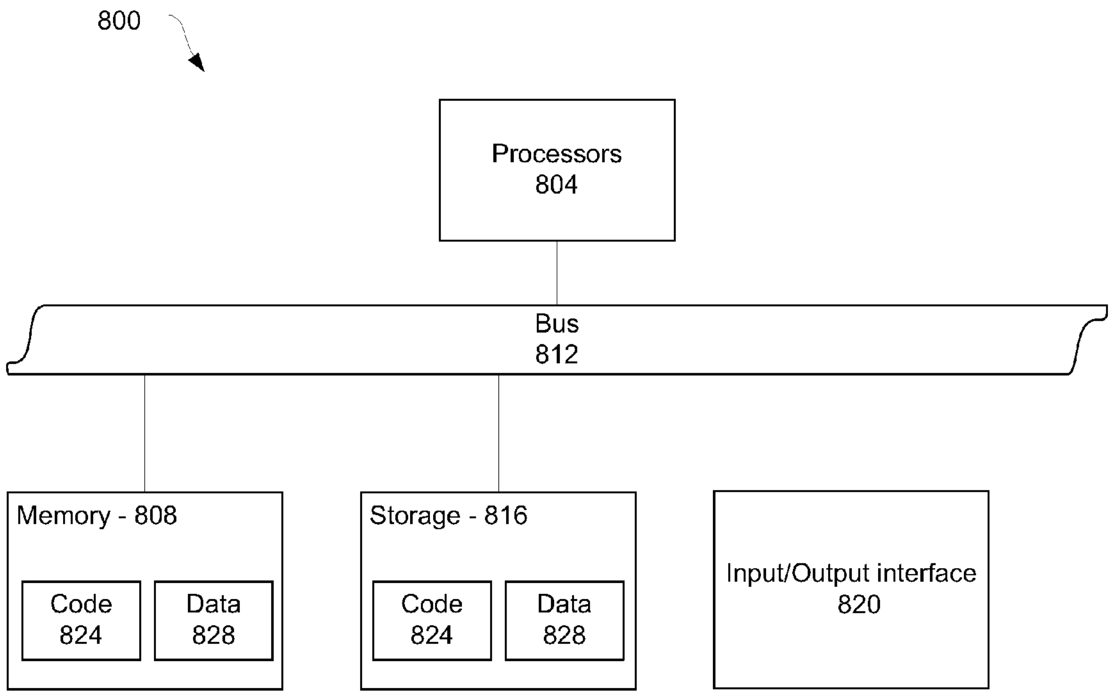
FIG. 8 illustrates a computing device capable of implementing a control block of an image translation device in accordance with various embodiments of the present invention.

FIG. 8 illustrates a computing device 800 capable of implementing a control block, e.g., control block 106, in accordance with various embodiments. As illustrated, for the embodiments, computing device 800 includes one or more processors 804, memory 808, and bus 812, coupled to each other as shown. Additionally, computing device 800 includes storage 816, and one or more input/output interfaces 820 coupled to each other, and the earlier described elements as shown. The components of the computing device 800 may be designed to provide the printing, scanning, and/or positioning functions of a control block of an image translation device as described herein.

Memory 808 and storage 816 may include, in particular, temporal and persistent copies of code 824 and data 828, respectively. The code 824 may include instructions that when accessed by the processors 804 result in the computing device 800 performing operations as described in conjunction with various modules of the control block in accordance with embodiments of this invention. The processing data 828 may include data to be acted upon by the instructions of the code 824. In particular, the accessing of the code 824 and data 828 by the processors 804 may facilitate printing, scanning, and/or positioning operations as described herein.

The processors 804 may include one or more single-core processors, multiple-core processors, controllers, application-specific integrated circuits (ASICs), etc.

The memory 808 may include random access memory (RAM), dynamic RAM (DRAM), static RAM (SRAM), synchronous DRAM (SDRAM), dual-data rate RAM (DDRRAM), etc.

The storage 816 may include integrated and/or peripheral storage devices, such as, but not limited to, disks and associated drives (e.g., magnetic, optical), USB storage devices and associated ports, flash memory, read-only memory (ROM), non-volatile semiconductor devices, etc. The storage 816 may be a storage resource physically part of the computing device 800 or it may be accessible by, but not necessarily a part of, the computing device 800. For example, the storage 816 may be accessed by the computing device 800 over a network.

The I/O interfaces 820 may include interfaces designed to communicate with peripheral hardware, e.g., a print device including one or more of a print head, navigation sensors, optical imaging sensors, etc., and/or other devices, e.g., a mobile telephone.

In various embodiments, computing device 800 may have more or less elements and/or different architectures.

Although specific embodiments have been illustrated and described herein, it will be appreciated by those of ordinary skill in the art and others, that a wide variety of alternate and/or equivalent implementations may be substituted for the specific embodiment shown and described without departing from the scope of the present invention. This application is intended to cover any adaptations or variations of the embodiment discussed herein. Therefore, it is manifested and intended that the invention be limited only by the claims and the equivalents thereof.

What is claimed is:

1. An image translation apparatus comprising:

a communication interface configured to receive image data from a mobile device;

an optical imaging sensor configured to capture a first plurality of surface images of a first portion of a medium;

a navigation sensor configured to capture first navigational measurements of the first portion of the medium, wherein the first navigational measurements provide an indication of motion of the image translation apparatus relative to the first portion of the medium;

a print head configured to selectively deposit a printing substance on the medium; and a control block configured to construct a composite image, wherein the composite image comprises the first plurality of surface images captured by the optical imaging sensor, and selectively control the print head to deposit the printing substance on the first portion of the medium based at least in part on i) the composite image, ii) the indication of motion of the image translation apparatus relative to the first portion of the medium provided by the first navigational measurements, and iii) the image data received from the mobile device.

2. The image translation apparatus of claim 1, wherein the control block includes a positioning module configured to:

control the navigation sensor; and determine a position of the image translation apparatus relative to a first reference point based at least in part on the first navigational measurements.

3. The image translation apparatus of claim 1, wherein the control block is further configured to:

control the navigation sensor to capture second navigational measurements of a second portion of the medium; and determine a plurality of positions of the image translation apparatus relative to a second reference point based at least in part on the second navigational measurements.

4. The image translation apparatus of claim 3, wherein the control block is further configured to:

control the optical imaging sensor to selectively capture a second plurality of surface images of the second portion of the medium; and construct the composite image based at least in part on i) the determined plurality of positions of the image translation apparatus and ii) the second plurality of surface images.

5. The image translation apparatus of claim 1, wherein the control block is further configured to transmit the first plurality of surface images to the mobile device.

6. The image translation apparatus of claim 1, wherein the control block is further configured to selectively control the print head to deposit the printing substance on the first portion of the medium based at least in part on a determined position of the image translation apparatus relative to the first portion of the medium.

7. The image translation apparatus of claim 1, further comprising an image capture module configured to control the optical imaging sensor to capture the first plurality of surface images.

8. The image translation apparatus of claim 1, further comprising an image processing module configured to process the image data in a manner to facilitate deposition of the printing substance.

9. The image translation apparatus of claim 1, wherein the print head includes a plurality of nozzles.

10. The image translation apparatus of claim 1, wherein the communication interface comprises a wireless communication interface.

11. The image translation apparatus of claim 1, wherein the image translation apparatus is configured to couple to the mobile device.

12. The apparatus of claim 1, wherein the control block is further configured to construct the composite image based at least in part on the first navigational measurements.

13. The apparatus of claim 1, wherein the control block is further configured to construct the composite image by stitching two or more of the first plurality of surface images.

14. A mobile device comprising:

a communication interface configured to receive image data from and provide image data to an image translation apparatus;

a positioning module configured to control a navigation sensor of the image translation apparatus to capture first navigational measurements of a first portion of a medium and to determine a position of the image translation apparatus relative to a first reference point based at least in part on the first navigational measurements;

an image capture module configured to control an optical imaging sensor of the image translation apparatus to capture a first plurality of surface images of the first portion of the medium, and construct a composite image based at least in part on (i) the first navigational measurements and (ii) the first plurality of surface images; and a print module configured to selectively cause a printing substance to be deposited on the first portion of the medium by the image translation apparatus based at least in part on (i) the first navigational measurements, (ii) the image data provided to the image translation apparatus, and (iii) the composite image.

15. The mobile device of claim 14, wherein the positioning module is further configured to control the navigation sensor to capture second navigational measurements of a second portion of the medium, and to determine a plurality of positions of the image translation apparatus relative to a second reference point based at least in part on the second navigational measurements.

16. The mobile device of claim 15, wherein the image capture module is further configured to control the optical imaging sensor to capture a second plurality of surface images of the second portion of the medium, and construct the composite image based at least in part on (i) the determined plurality of positions of the image translation apparatus and (ii) the second plurality of surface images.

17. The mobile device of claim 14, wherein the image capture module is configured to transmit the first plurality of surface images to a remote device.

18. The mobile device of claim 17, wherein the image capture module is configured to transmit the first plurality of surface images to the remote device by a selected one of e-mail, fax, and file transfer protocol.

19. The mobile device of claim 14, further comprising an image processing module configured to process the image data in a manner to facilitate deposition of the printing substance.

20. The mobile device of claim 14, wherein the communication interface comprises a wireless communication interface.

21. The mobile device of claim 14, wherein the mobile device is configured to couple to the image translation apparatus.

22. A method comprising:

receiving image data from a mobile device;

controlling a navigation sensor to capture first navigational measurements of a first portion of a medium;

controlling an optical image sensor to capture a first plurality of surface images of the first portion of the medium;

constructing a composite image based at least in part on the first navigational measurements and the first plurality of surface images; and selectively controlling a print head to deposit a printing substance based at least in part on the first navigational measurements and the image data.

23. The method of claim 22, further comprising:

determining a position of an image translation device relative to a first reference point based at least in part on the first navigational measurements.

24. The method of claim 23, further comprising:

controlling the navigation sensor to capture second navigational measurements of a second portion of the medium;

determining a plurality of positions of the image translation device relative to a second reference point based at least in part on the second navigational measurements;

controlling the optical image sensor to capture a second plurality of surface images of the second portion of the medium; and wherein said constructing the composite image is further based at least in part on the determined plurality of positions and the second plurality of surface images.

25. The method of claim 22, further comprising:

determining a position of the image translation device based at least further in part on one or more of the plurality of surface images.

26. The method of claim 22, further comprising:

processing the received image data in a manner to facilitate said controlling of the print head to deposit the printing substance.

27. The method of claim 22, further comprising:

selectively transmitting the first plurality of surface images to the mobile device.

* * * * *